United States Patent [19]

Koyama et al.

[11] 4,336,559

[45] Jun. 22, 1982

[54] RECORDED TAPE TRAVEL CONTROL SYSTEM

[76] Inventors: Tsuneyuki Koyama, No. 5408, Hino-Machi, Kohnan-Ku, Yokohama-City, Kanagawa-ken; Katsuya Yasutake, No. 410 Katakura-Cho, Kanagawa-Ku, Yokohama-City, Kanagawa-ken, both of Japan

[21] Appl. No.: 959,109

[22] Filed: Nov. 9, 1978

[30] Foreign Application Priority Data

Nov. 11, 1977 [JP] Japan .............................. 52-135321

[51] Int. Cl.$^3$ .......................... G11B 15/48; H02P 5/00
[52] U.S. Cl. ...................................... 360/73; 318/314; 318/318; 360/14
[58] Field of Search ..................... 360/90, 14, 73, 74.1, 360/10; 318/314, 318, 391

[56] References Cited

U.S. PATENT DOCUMENTS

| | | | |
|---|---|---|---|
| 3,641,279 | 2/1972 | Ganske | 360/90 X |
| 3,887,856 | 6/1975 | Cicchiello | 318/391 X |
| 4,040,098 | 8/1977 | Beeson et al. | 360/14 |
| 4,167,764 | 9/1979 | Hanajima et al. | 360/90 |
| 4,210,939 | 7/1980 | Ninomiya et al. | 360/14 |
| 4,211,967 | 7/1980 | Akiyama et al. | 318/318 X |

Primary Examiner—Bernard Konick
Assistant Examiner—Donald McElheny, Jr.
Attorney, Agent, or Firm—Louis Bernat

[57] ABSTRACT

A recorded tape travel control system uses a motor for rotationally driving a capstan which, in turn, drives a tape. First and second manipulation switches, respectively, generate first and second manipulation signals. A circuit for changing the rotational direction of the motor responds to the manipulation signals of the manipulation switch. A speed change circuit operates in response to the manipulation signals which are generated by manipulating, in continuous succession, a plurality of times either the first or the second manipulation switches in order to increase the rotational speed of the motor in a stepwise manner. Speed also decreases in a stepwise manner in response to manipulation signals generated by alternately manipulating the first and second manipulation switches. A circuit is also provided for stopping the rotation of the motor.

6 Claims, 2 Drawing Figures

RECORDED TAPE TRAVEL CONTROL SYSTEM

BACKGROUND OF THE INVENTION

The present invention relates generally to tape recording techniques and apparatus and to systems for controlling the tape travel therein. More particularly, the invention relates to a tape travel control system suitable for stopping the tape travel at a desired position for recording on a tape.

In general, there are instances wherein only desired program portions are selectively extracted from a recorded tape and the portions are then joined to produce a single recorded tape which has been edited. In such an editing system, an apparatus reproduces a pre-recorded tape on which the signals to be edited have been recorded and an apparatus re-records the reproduced portions, on an unrecorded tape. The signals which have been thus selectively reproduced by the reproducing apparatus are used to make a new recording.

In this editing process, the first step comprises seeking out the first desired recording portions in the pre-recorded tape as this tape is being reproduced in the reproducing apparatus and stopping the tape at the starting position of this desired recorded portion. Next, as this first desired recorded portion is being reproduced by the reproducing apparatus, the reproduced signal is re-recorded on a previously unrecorded tape by means of the recording apparatus. When this re-recording of the first desired recorded portion ends, the recording apparatus is once again stopped.

Then, as the above mentioned pre-recorded tape is reproduced, a second desired recorded portion in this tape is sought out. This tape is stopped at the starting point of this second desired recorded portion. Next, as this second desired recorded portion is reproduced by the reproducing apparatus, the reproduced signal is recorded as a continuation to the above mentioned first recorded signal by means of the recording apparatus. By repeating these steps thereafter, a recorded tape is obtained on which a plurality of desired recorded information sections have been edited and re-recorded in the recording apparatus.

For a recorded video signal, the step of seeking out each of the above mentioned desired recorded portions in the reproducing apparatus is carried out by reproducing the tape, supplying the resulting reproduced signal to a monitor television receiver, and observing the reproduced picture. To stop the tape at the starting point of the desired recorded portion on the tape, the monitor television receiver is observed. At the instant when the beginning of the reproduction of the desired recorded information is detected, the tape is stopped.

In actual practice, however, the arrival at the desired recorded portion cannot be detected unless the reproduction of this desired recorded portion has already begun. Even if the tape travel is stopped instantaneously, the leading position at the start of the desired recorded portion will have already passed by. In actual practice, furthermore, there is a time delay from the instant at which the operator detects the start of the reproduction of the desired recorded portion to the instant at which he reacts and carries out the manipulation for stopping the tape travel. Still another difficulty is that, because the traveling tape and related parts have momentum, the tape travel will not stop instantaneously even if the reproducing apparatus is instantaneously placed in its stop mode. Consequently, the tape stops at a position which is separated (advanced in the forward direction) from the leading point at the start of the desired recorded portion. Particularly when the tape is traveling at high speed, in order to seek out the desired recorded portions in a short time, this positional separation becomes large.

Accordingly, in order to stop the tape at the desired starting point, a manipulative procedure comprises driving the tape at high speed in the forward direction, stopping the tape travel when the starting point of the desired recorded portion has passed by, thereafter driving the tape at low speed in the reverse direction to return the tape through the distance which it passed in the forward direction, and then stopping the tape at the correct starting point. Furthermore, in driving the tape in the reverse direction, the tape may again overshoot the starting point, in which case it is necessary to drive the tape at low speed in the forward direction.

In known apparatus, the manipulation part for changing the tape travel direction and for changing the tape travel speed have been independent of each other. There has been no mutual interrelation therebetween whatsoever. For this reason, in order to stop the tape at the correct starting point, it has been necessary to separate the manipulation for changing the tape travel direction and the manipulation for changing the tape travel speed. This procedure has been unsatisfactory because it is troublesome, requires time, and requires a skilled operator.

SUMMARY OF THE INVENTION

Accordingly, it is a general object of the present invention to provide a novel and useful tape travel controlling system in which the above described difficulties have been overcome.

Another and specific object of the invention is to provide a tape travel control system in which only a manipulation of a pair of manipulative control parts is required for changing the tape travel direction, and, at the same time, changing of the tape travel speed, in a multistage manner. By the use of the system of the invention, the starting positions of the desired recorded portions on the tape can be sought out accurately, positively, and in a short time with a very simple manipulation.

Other objects and further features of the invention will be apparent from the following detailed description when read in conjunction with the accompanying drawings.

DETAILED DESCRIPTION

One example of a reproducing apparatus in which the tape travel control system of the present invention can be applied will first be briefly described with reference to FIG. 1. An apparatus of this type is described in detail in, for example, the U.S. Pat. Nos. 3,825,944 and 3,911,492.

Figure 1:
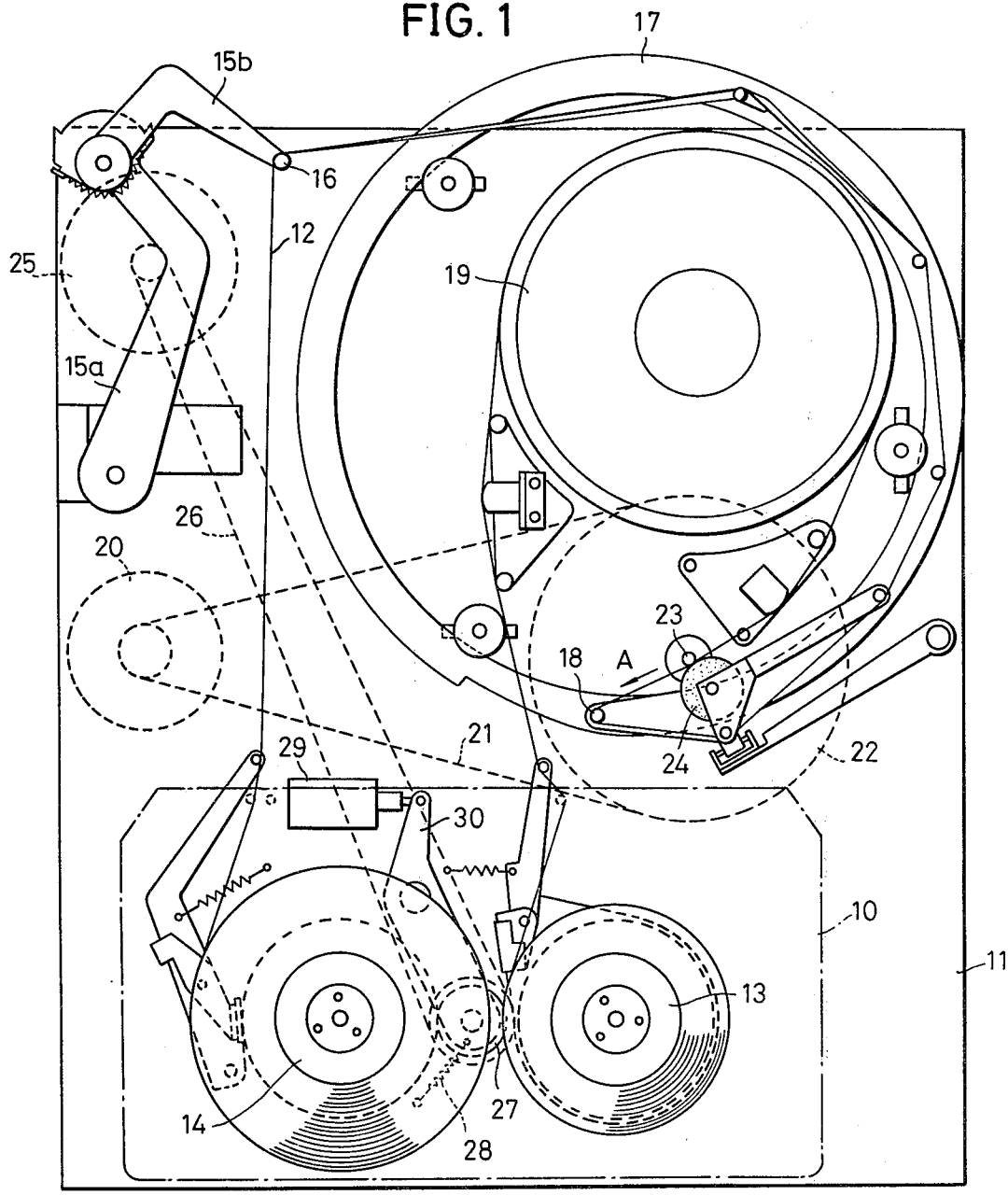
FIG. 1 is a plan view of one example of a reproducing apparatus in which the tape travel control system of the present invention can be applied.

In the recording apparatus illustrated in FIG. 1, a tape cassette 10 is loaded in a specific position on a chassis 11. The cassette accommodates a tape supply-side reel 13 and a tape takeup-side reel 14 on which is wound a magnetic tape 12. Video signals to be edited are already pre-recorded on the magnetic tape 12. When this apparatus is placed in its play (reproducing) mode, levers 15a and 15b rotate, and a pole 16 on the free end of the lever 15b engages the tape 12 and draws it from the interior of the cassette 10. Thereafter, a revolving ring 17 revolves, and a pole 18 engages the tape 12 and pulls it around, whereupon the tape path shown in FIG. 1 is formed.

A stationary guide drum 19, comprising a rotating drum having two reproducing heads at diametrically opposite positions thereon, are disposed inside of the revolving ring. The reproducing heads of the rotating drum operate to reproduce the signal recorded on the tape 12 traveling in the above mentioned tape path.

At the time of tape travel in the forward direction, a capstan motor 20 rotates in a regular direction, and this rotation is transmitted through an endless belt 21 and a flywheel 22 to rotate a capstan 23 in the normal direction. As a result, the tape 12, which is clamped between the capstan 23 and a pinch roller 24, is driven in the forward travel direction indicated by the arrow A. Furthermore, the rotational power of another motor 25 is transmitted through an endless belt 26 to drive a driving roller 27, which is being pressed by a spring 28 against a disc of the reel on the takeup side, whereby the takeup reel 14 is rotated in the tape takeup direction. As a result, the tape 12 is unwound from the supply reel 13, driven in forward traveling movement by the capstan 23, and taken up by the takeup reel 14.

When the tape 12, responsive to a manipulative procedure described hereinafter, travels in the reverse direction, the motor 20 rotates in the reverse direction, and the capstan 23 also rotates in the reverse direction. The tape 12 accordingly travels in the direction opposite to the arrow A direction. Furthermore, a solenoid 29 operates to rotate counterclockwise a lever 30 which is rotatably supporting the driving roller 27 at one end thereof. By overcoming the force of the spring 28, the driving roller 27 is pressed against the reel disc of the reel 13 on the supply side. The supply reel 13 thereupon rotates in the direction for winding up the tape. The tape 12, which is driven to travel in the reverse direction by the capstan 23, is wound on the supply reel 13. At this time, the tape is unwound from the takeup reel 14.

Figure 2:
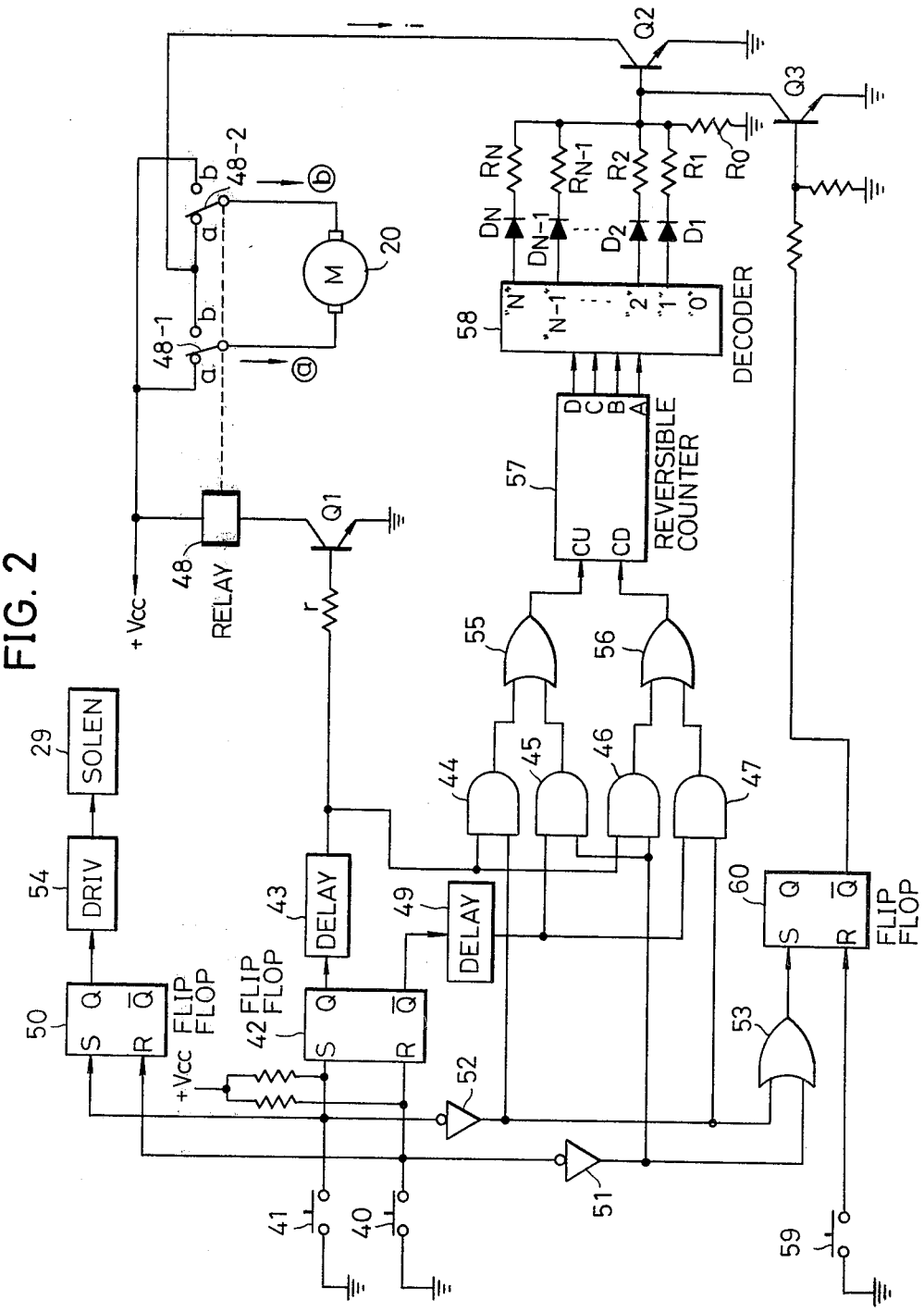
FIG. 2 is a block diagram of one circuit embodiment of the tape travel control system according to the invention.

In the reproducing apparatus of the above described character, the tape travel control system of the present invention is applicable, one embodiment of which will now be described with reference to FIG. 2.

Two normally-open forward and reverse switches 40 and 41 are connected at their terminals, on one side, respectively to ground (earth) and, at their other terminals, respectively to reset and set terminals of a flip-flop circuit 42. This flip-flop circuit 42 is set and reset respectively by the trailing edges of a set input pulse signal and a reset input signal. At the time of setting, the Q output of the flip-flop circuit 42 becomes a high level (i.e., a voltage substantially the same as the power source voltage $+V_{cc}$), while the $\overline{Q}$ output becomes one of low level (i.e., substantially 0V). The Q output terminal of the flip-flop circuit 42 is connected by way of a delay circuit 43 to one each of the input terminals of AND gates 44 and 46 and, at the same time, is connected by way of a resistor r to the base of a transistor Q1. A relay 48 is connected between the collector of the transistor Q1 and the power source. Relay switches 48-1 and 48-2 are switched by the relay 48. The moving contacts are connected from the terminals of the capstan motor 20 to the contact points a and a when the relay 48 is released.

The $\overline{Q}$ output terminal of the flip-flop circuit 42 is connected by way of a delay circuit 49 to one each of the input terminals of AND gates 45 and 47. A terminal of the forward switch 40 is also connected to the reset terminal R of a flip-flop circuit 50 and, at the same time, is connected through an inverter 51 to the other input terminals of the AND gates 45 and 46 and to one of the input terminals of an OR gate 53. The terminal of the reverse switch 41 is connected to the set terminal S of the flip-flop circuit 50 and, at the same time, is connected through an inverter 52 to the other input terminals of the AND gates 44 and 47 and to the other input terminal of the OR gate 53.

When, in the above described circuit, the forward switch 40 is once closed, and the flip-flop circuit 42 is reset, its Q output is at a low level, and the transistor Q1 is nonconductive. Consequently, no current passes through the relay 48, and the moving contacts of the switches 48-1 and 48-2 are close to contact points a and a. At this time, furthermore, transistor Q2 is conductive. As a consequence, a current flows in the arrow direction ⓐ through the capstan motor 20, which thereupon rotates in the normal direction, and the tape 12 is driven in the forward travel direction as indicated by the arrow A (FIG. 1). Furthermore, the flip-flop circuit 50 is also in its reset state, no output being produced through its Q output terminal, and the solenoid 29 is released. The driving roller 27 is thereby pressed against and rotates the disc of the takeup reel, as described hereinbefore in conjunction with FIG. 1. Accordingly, the tape 12 is sent in the forward direction by the capstan 23 which is driven by the capstan motor 20. The tape is taken up by the takeup reel 14.

With the system in this state, the tape may be driven in the forward direction at a higher speed. The desired recorded portions are to be sought out in a shorter time; therefore, the forward switch 40 is again closed. Even when the switch 40 is thus closed, the flip-flops 42 and 50 remain reset. The moving contacts of the switches 48-1 and 48-2 remain connected to their contact points a and a. Furthermore, the solenoid 29 remains released. As another result of the closure of the switch 40, inputs are applied via the inverter 51 to the AND gates 45 and 46. At this time, the Q output of the flip-flop circuit 42 is being applied via the delay circuit 49 to the AND gates 45 and 47. Consequently, an output is produced by the AND gate 45 and applied by way of an OR gate 55 to the count-up terminal CU of a reversible counter 57. This counter 57 thereupon carries out an additional operation, and its output changes into a signal which has increased its count by one.

The output side of the reversible counter 57 is connected to a decoder 58. Only the output terminals of the decoder 58, corresponding to the output contents of the counter 57 become of high level, and the other output terminals become a low level. The output terminals of the decoder 58 are respectively connected via diodes D1 through $D_N$ to resistors R1 through $R_N$. The resistors R1 through $R_N$ are commonly connected to the base of the transistor Q2 whose collector is connected to the contact point a of the switch 48-2 and also to a contact point b of the switch 48-1 and whose emitter is grounded (earthed). A resistor Ro and a transistor Q3 are connected in parallel, between the base of the transistor Q2 and the ground (earth).

When the output of the counter 57 increases its count by one, the output terminals of the decoder 58 which are at a high level shift to the side which is greater by one number. For example, it will be assumed that an output terminal "1", to which the diode D1 is connected, has hitherto been at a high level. Then, as a result of the above described operation, the output terminal "1" becomes a low level, and an output terminal "2", connected to the diode D2, becomes a high level. Here, the resistance values respectively of the resistors R1 through $R_N$ are selected so that they become successively less with the increasing numeral of the subscript of the resistor designation, that is, $R1 > R2 > \ldots > R_N$.

Accordingly, when the switch 40 is pressed once as mentioned hereinabove, the voltage applied to the base of the transistor Q2 becomes high, whereby the resistance value of the transistor Q2 becomes low. The current i flowing through the capstan motor 20 becomes large. As a consequence, the motor 20 rotates at a high speed, and the speed of the tape driven to travel in the forward direction also becomes high. Similarly thereafter, every time the switch 40 is closed, the counter 57 counts up, and the rotational speed of the capstan motor 20 successively increases in a stepwise manner.

While the picture reproduced on the screen of the monitor television receiver is being observed, if the reproduction of a desired recorded information is detected, the reverse switch 41 is closed. This closure of the switch 41 causes the flip-flop circuits 42 and 50 to be set. As a result of the setting of the flip-flop circuit 42, an output is produced through its Q output terminal and is applied via the delay circuit 43 to the base of the transistor Q1. The transistor Q1 thereby becomes conductive to pass a current through the relay 48, whereupon the moving contacts of the switches 48-1 and 48-2 are shifted into contact with their respective contact points b and b. As a consequence, a current flows in the arrow direction ⓑ through the capstan motor 20, which thereupon rotates in the reverse direction. Accordingly, the tape 12 is driven to travel in the direction opposite to the arrow direction A (FIG. 1).

As a result of the setting of the flip-flop circuit 50, an output is produced through its Q output terminal and is applied by way of a driving circuit 54 to operate the solenoid 29. The driving roller 27 is thereby pressed against the disc of the supply reel 13 as described hereinbefore in conjunction with FIG. 1. The supply reel 13 is thereby rotated in the direction for winding up the tape and thus winds up the tape driven by the capstan 23 in the reverse direction. By this tape travel in the reverse direction, there is a rewinding of the tape length which has gone by after the switch manipulation following the detection of the position of the desired recorded portion during forward travel of the tape and before the actual start of the reverse direction of the tape travel.

On the other hand, closing the switch 41 produces a closure signal which is applied via the inverter 52 to the AND gates 44 and 47. At the time of this closure of the switch 41, the Q output of the flip-flop circuit 42 is still being applied through the delay circuit 49 to the AND gates 45 and 47. For this reason, an output is produced by the AND gate 47 and is applied through an OR gate 56 to a count-down terminal of the reversible counter 57. As a result, the counter 57 carries out a subtraction operation. Its output changes into a signal which has been counted down or reduced by one. The output of the decoder 58 shifts to an output terminal connected to a resistor having a resistance value which is higher by one step, and the resistance value of the transistor Q2 increases by one step. Therefore, the motor 20 rotates in the reverse direction at a rotational speed which is one step slower than its speed at the time of regular rotation. The tape 12 travels in the reverse direction at a travel speed which is one step slower than the speed at the time of travel in the forward direction.

When the tape 12 traveling in reverse direction passes beyond the starting position of the desired recorded portion, the forward switch 40 is closed. Consequently, the flip-flop circuits 42 and 50 are again reset. Similarly, as in the above described operation, the switches 48-1 and 48-2 are switched to their contact points a and a, and the motor 20 rotates in the regular direction thereby to feed the tape 12 in the forward direction. The solenoid 29 releases, and the takeup reel 14 is rotated in the takeup direction.

On the other hand, as a result of the closure of the switch 40, an input is applied to the AND gates 45 and 46. At this time, the Q output of the flip-flop 42 is being applied through the delay circuit 43 to the AND gates 44 and 46. For this reason, an output is produced from the AND gate 46 and is applied by way of the OR gate 56 to the count-down terminal CD of the reversible counter 57. The counter 57 thereby further carries out a subtraction and produces an output which has been counted down by one. Therefore, the motor 20 rotates in the normal direction at a low speed, which has been reduced further by one step, from the reverse direction rotational speed which was, in turn, reduced by one step.

By alternately closing the switches 41 and 40 thereafter in a similar manner, the tape travel speed is reduced by one step each time that there is a switch operation. The travel of the tape in the reverse direction and in the forward direction is repeated. Therefore, by alternately closing the switches 40 and 41, the tape travel speed can be progressively reduced and thereby caused to converge accurately at the starting position of the desired recorded portion.

After convergence at the starting position of the desired recorded portion has been substantially achieved in this manner, a still switch 59 is closed. As a result, a flip-flop 60 is reset, and its $\overline{Q}$ output is applied to the base of the transistor Q3. At this time, the transistor Q3 becomes conductive, and the base of the transistor Q2 is grounded, whereby the transistor Q2 becomes nonconductive. Therefore, the rotation of the motor 20 stops, and the tape 12 stops its travel at the starting position of the desired recorded portion.

When the switch 40 or 41 is closed in order to seek out the next succeeding desired recorded portion, the closure signal is applied via the OR gate 53 to the set terminal of the flip-flop circuit 60, whose $\overline{Q}$ output vanishes. As a consequence, the transistor becomes nonconductive, and the motor 20 again rotates.

In the system of the present invention, as described above, the tape travel speed is reduced each time the tape travels in a forward or a reverse direction. Thus, convergence to the starting position of the desired recorded portion can be achieved very accurately and readily. Furthermore, since the tape is substantially at the starting position of the desired recorded portion when the still switch 59 is closed, and, moreover, the tape is traveling at low speed, when the starting position of the desired recorded portion is reached, the tape travel can be stopped very accurately at that position.

If the succeeding desired recorded portion is already taken up on the takeup reel, and it is desired to drive the tape at high speed in the reverse direction, the reverse switch 41 is closed a plurality number of times in continuous succession. In this case, an output from the AND gate 44 is applied each time to the count-up terminal CU of the reversible counter 57. The reverse rotation speed of the motor 20 becomes successively higher. By alternately closing the switches 40 and 41 thereafter, the motor 20 is caused to repeat alternations of regular and reverse rotation, and, at the same time, the rotational speed decreases, as described hereinabove.

Further, this invention is not limited to these embodiments. Variations and modifications may be made without departing from the scope of the invention.

What is claimed is:

1. A tape travel control system comprising:
a motor and a capstan, said motor rotationally driving said capstan for transporting a tape;
forward and reverse manipulation means for respectively generating forward and reverse signals responsive to a selective manipulation thereof;
rotational direction changing means selectively responsive to said forward and reverse signals for selectively changing the rotational direction of the motor in order to rotate the motor in a forward direction in response to the forward signal generated by manipulating the forward manipulation means and to rotate the motor in a reverse direction in response to the reverse signal generated by manipulating the reverse manipulation means;
speed changing means operating repeatedly in response to the number of the forward signals or the reverse signals which are generated by sequentially manipulating either the forward or the reverse manipulation means a plurality of times in a continuous succession, each of said manipulations changing the rotational speed of the motor in a step manner, said speed changing means operating in response to the sequence of forward and reverse signals generated by alternately manipulating the forward and reverse manipulation means in order to decrease the rotational speed of the motor in a step manner, said rotational direction changing means and said speed changing means being operated responsive to the signals generated by the forward and the reverse manipulation means; and
means for independently stopping the rotation of the motor, whereby said manipulation means may be operated to bring the tape to a desired location and then the independent stopping means may be operated to bring the tape to rest at that desired location.

2. A tape travel control system as claimed in claim 1 in which the rotational direction changing means comprises a changeover switch for changing the direction of a driving current supplied to the motor, a relay for changing over the switch, and a circuit means for operating the relay in response to a manipulation of the forward manipulation means but not operating the relay in response to a manipulation signal of the reverse manipulation means.

3. A tape travel control system as claimed in claim 1 in which the speed changing means comprises: first discrimination circuit means for detecting repeated operation of either the forward or reverse manipulation means when the operated manipulation means has been manipulated a plurality of times in a continuous succession; second discrimination circuit means for detecting when there is an alternating operation of the forward and reverse manipulation means; memory circuit means having a memory content which changes in response to the outputs of the first and second discrimination circuit means; and current control circuit means for selectively causing a different current level in the motor in order to operate it at different levels in response to the memory content of the memory circuit.

4. A tape travel control system as claimed in claim 3 in which the memory circuit means comprises a reversible counter for carrying out an addition in response to the output of the first discrimination circuit and a subtraction in response to the output of the second discrimination circuit, said reversible counter producing an output which varies as a result of the addition and subtraction.

5. A tape travel control system as claimed in claim 4 in which the current control circuit means comprises a decoder having a plurality of output terminals which causes a current at progressive higher levels in response to the output of the reversible counter, a plurality of resistors of different resistance values respectively connected to the output terminals of the decoder, a transistor having a base to which the plurality of resistors are connected and means for connecting said transistor to supply current to the motor.

6. A tape travel control system as claimed in claim 1 for use in a signal reproducing apparatus comprising a tape supply reel carrying a tape on which a signal has been recorded, a tape takeup reel for taking up the tape, means for reproducing the signal from the tape, means for rotationally driving the supply reel and the takeup reel in their respective tape winding directions, and changeover means for selectively causing the rotationally driving means to drive either the supply reel or the takeup reel, said system further comprising a circuit means operated in response to the manipulation signals of the forward and reverse manipulation means to controllably operate the changeover means and to selectively cause either the supply reel or the takeup reel to wind up the tape as it is driven by the capstan.

* * * * *

UNITED STATES PATENT AND TRADEMARK OFFICE
CERTIFICATE OF CORRECTION

PATENT NO. : 4,336,559
DATED : June 22, 1982
INVENTOR(S) : Tsuneyuki Koyama et al.

It is certified that error appears in the above-identified patent and that said Letters Patent are hereby corrected as shown below:

The cover sheet should read as follows:

--[73] Assignee: Victor Company of Japan, Ltd., Yokohama City, Kanagawa-ken, Japan--

Col. 2, line 6, before "becomes" insert --between the desired stopping point and the actual stopping point--.

Col. 4, line 62, after "become" delete "of" and insert therefor --a--.

Col. 5, line 64, change "Q" to read --$\bar{Q}$--.

Col. 6, line 13, after "direction" insert --again--.

Signed and Sealed this

Seventh Day of December 1982

[SEAL]

Attest:

Attesting Officer

GERALD J. MOSSINGHOFF
Commissioner of Patents and Trademarks